(12) United States Patent
Fu et al.

(10) Patent No.: US 7,440,412 B2
(45) Date of Patent: Oct. 21, 2008

(54) LINK QUALITY PREDICTION

(75) Inventors: Dengwei Fu, Cupertino, CA (US); Sujai Chari, San Franciso, CA (US); Mohan Ramasudha Karnam, Sunnyvale, CA (US)

(73) Assignee: Tzero Technologies, Inc., Sunnyvale, CA (US)

( * ) Notice: Subject to any disclaimer, the term of this patent is extended or adjusted under 35 U.S.C. 154(b) by 316 days.

(21) Appl. No.: 11/374,550

(22) Filed: Mar. 13, 2006

(65) Prior Publication Data

US 2007/0211641 A1      Sep. 13, 2007

(51) Int. Cl.
*H04L 12/26* (2006.01)

(52) U.S. Cl. .................. 370/252; 370/343

(58) Field of Classification Search .......... 370/332, 370/333, 241, 252, 253, 343
See application file for complete search history.

(56) References Cited

U.S. PATENT DOCUMENTS

| | | | |
|---|---|---|---|
| 4,404,674 A | | 9/1983 | Rhodes |
| 5,280,637 A | * | 1/1994 | Larosa et al. ............... 455/134 |
| 6,532,258 B1 | * | 3/2003 | Goldston et al. ............ 375/227 |
| 7,076,263 B2 | * | 7/2006 | Medvedev et al. .......... 455/522 |
| 7,333,556 B2 | * | 2/2008 | Maltsev et al. .............. 375/295 |
| 7,342,972 B1 | * | 3/2008 | Giannakis et al. ........... 375/259 |
| 2002/0099997 A1 | * | 7/2002 | Piret .......................... 714/781 |
| 2002/0163980 A1 | * | 11/2002 | Ruohonen ................... 375/345 |
| 2003/0043732 A1 | * | 3/2003 | Walton et al. ............... 370/208 |
| 2003/0231655 A1 | * | 12/2003 | Kelton et al. ................ 370/468 |
| 2004/0264587 A1 | | 12/2004 | Morejon et al. |
| 2005/0068916 A1 | * | 3/2005 | Jacobsen et al. ............ 370/328 |
| 2005/0128954 A1 | | 6/2005 | Li et al. |
| 2006/0013326 A1 | | 1/2006 | Yoshida |
| 2006/0014542 A1 | * | 1/2006 | Khandekar et al. .......... 455/447 |
| 2006/0057965 A1 | * | 3/2006 | Braun et al. ............. 455/67.11 |
| 2006/0246916 A1 | * | 11/2006 | Cheng et al. ................ 455/450 |
| 2007/0149134 A1 | * | 6/2007 | Sebire et al. ............. 455/67.11 |
| 2007/0242731 A1 | * | 10/2007 | Ghosh ........................ 375/147 |
| 2007/0268881 A1 | * | 11/2007 | Moorti et al. ............... 370/338 |

OTHER PUBLICATIONS

Cideciyan, Eleftheriou, New Bounds on Convolutional Code Performance over Fading Channels, 1994, IEEE.

* cited by examiner

*Primary Examiner*—Kwang B. Yao
*Assistant Examiner*—Kenan Cehic
(74) *Attorney, Agent, or Firm*—Brian R. Short (57) ABSTRACT

A method and apparatus of predicting link quality of a link is disclosed. The method includes receiving multi-carrier modulated signals over a period of time, estimating an SNR for each received sub-carrier, constructing a sequence of the SNRs, and estimating link PER based upon knowledge of encoding and/or interleaving used during transmission, and the sequence of SNRs.

20 Claims, 7 Drawing Sheets

CONVOLVING THE SEQUENCE WITH CODEWORDS

510

GENERATING A SEQUENCE OF PROBABILITY OF ERROR VALUES BY MAPPING EACH OUTPUT OF THE CONVOLUTION

520

ESTIMATING LINK PER BY SUMMING THE PROBABILITY OF ERROR VALUES

```
┌─────────────────────────────────────────────┐
│  RECEIVING MULTI-CARRIER MODULATED SIGNALS OVER A │
│                PERIOD OF TIME                │
│                                              │
│                     610                      │
└─────────────────────┬───────────────────────┘
                      │
┌─────────────────────▼───────────────────────┐
│   ESTIMATING AN SNR FOR EACH RECEIVED SUB-CARRIER │
│                                              │
│                     620                      │
└─────────────────────┬───────────────────────┘
                      │
┌─────────────────────▼───────────────────────┐
│         CONSTRUCTING A SEQUENCE OF THE SNRS  │
│                                              │
│                     630                      │
└─────────────────────┬───────────────────────┘
                      │
┌─────────────────────▼───────────────────────┐
│  ESTIMATING LINK PER FOR ALL POSSIBLE TRANSMISSION │
│  MODES BASED UPON KNOWLEDGE OF ENCODING USED │
│     DURING TRANSMISSION AND THE SEQUENCE     │
│                                              │
│                     640                      │
└─────────────────────┬───────────────────────┘
                      │
┌─────────────────────▼───────────────────────┐
│ SELECTING A TRANSMISSION MODE BASED UPON THE LINK │
│                PER ESTIMATES                 │
│                                              │
│                     650                      │
└─────────────────────────────────────────────┘
```

LINK QUALITY PREDICTION

FIELD OF THE INVENTION

The invention relates generally to communication systems. More particularly, the invention relates to a method and apparatus for predicting transmission link quality.

BACKGROUND OF THE INVENTION

Figure 1:
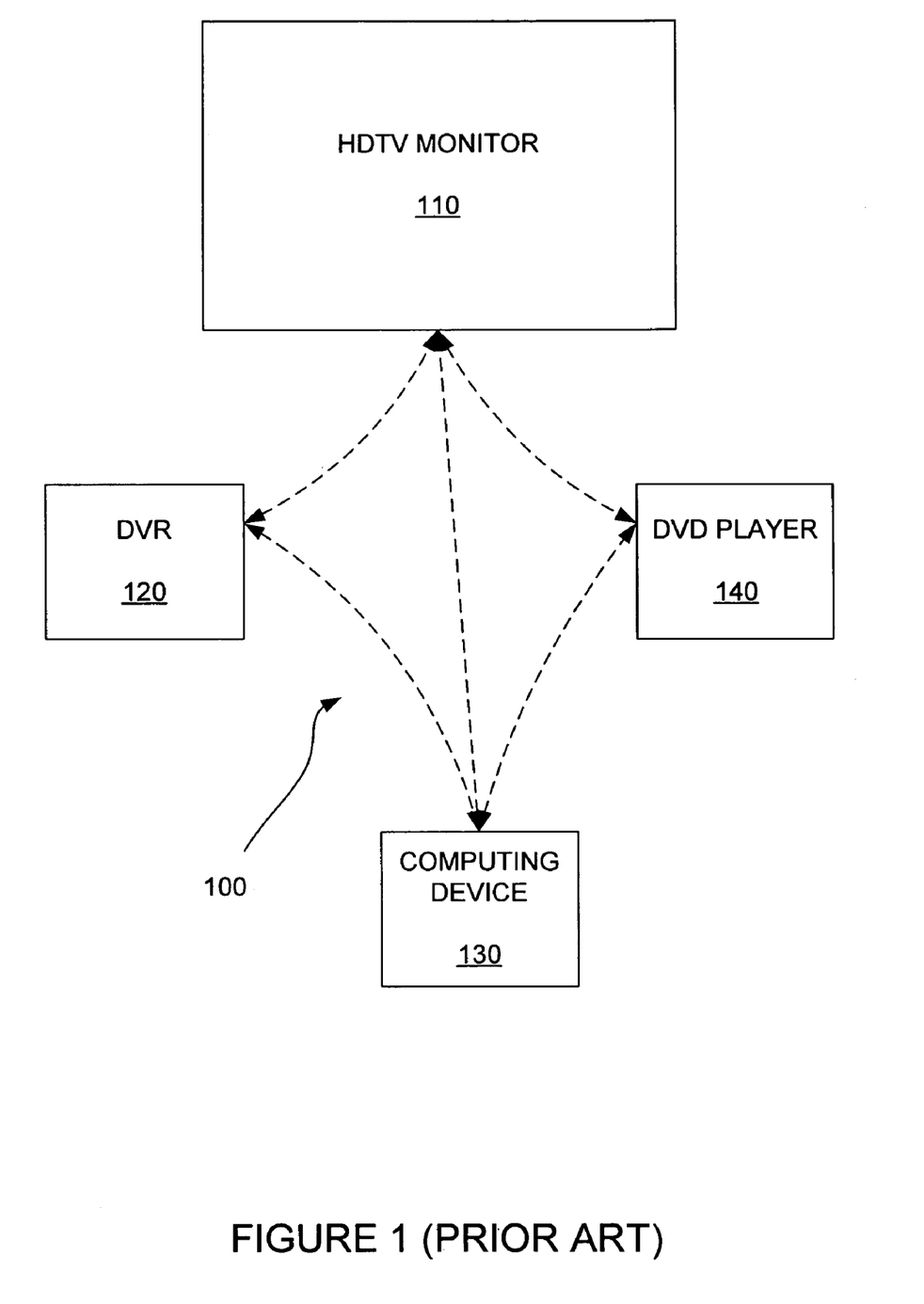
FIG. 1 shows a prior art UWB mesh network.

Ultra-wideband (UWB) modulation provides high data rate radio communications for transferring data using very wide modulation bandwidths. FIG. 1 shows a typical application of UWB communication links used for indoor wireless communications. Several transceivers, for example, transceivers 110, 120, 130, 140 are part of a network 100 allowing high bandwidth communications between the transceivers 110, 120, 130, 140. The transceivers 110, 120, 130, 140 can include, for example, a high definition television (HDTV) monitor networked with other devices, such as, a digital video recorder (DVR), a digital video disk (DVD) player and a computing device.

The Federal Communications Committee (FCC) has mandated that UWB radio transmission can legally operate in the frequency range of 3.1 GHz to 10.6 GHz. The transmit power requirement for UWB communications is that the maximum average transmit Effective Isotropic Radiated Power (EIRP) is −41.25 dBm/MHz in any transmit direction. The bandwidth of each transmission channel is 528 MHz.

Due to the low-power transmission associated with UWB communications, it is desirable to be able to predict link qualities between UWB devices. The links are subject to noise and interference, and as a result, can vary greatly in quality. A prior art method of determining link quality includes measuring signal to noise ratio (SNR) of transmission signals. However, in high-bandwidth transmission, SNR is not always a good indicator of packet error rate (PER) of transmitted data. The noise and/or interference can vary greatly over the large transmission frequency band. Two different transmission links having a similar measured average SNR can provide considerably different transmission data rate capacities. The optimal mode selection should provide the best quality transmission link.

It is desirable to have a method and apparatus for predicting transmission link quality for different transmission configurations. It is desirable that the method and apparatus be efficient, and not require additional transmission bandwidth.

SUMMARY OF THE INVENTION

An embodiment of the invention includes a method of predicting link quality of a link. The method includes receiving multi-carrier modulated signals over a period of time, estimating an SNR for each received sub-carrier, constructing a sequence of the SNRs, and estimating link PER based upon knowledge of encoding used during transmission, and the sequence of SNRs.

Another embodiment of the invention includes a method of selecting a transmission mode of a transmission link based on a predicted link quality of the link. The method includes receiving multi-carrier modulated signals over a period of time, estimating an SNR for each received sub-carrier, constructing a sequence of the SNRs, estimating link PER for all possible transmission modes based upon knowledge of encoding used during transmission and the sequence, and selecting a transmission mode based upon the link PER estimates.

Other aspects and advantages of the present invention will become apparent from the following detailed description, taken in conjunction with the accompanying drawings, illustrating by way of example the principles of the invention.

BRIEF DESCRIPTION OF THE DRAWINGS

The present invention is readily understood by the following detailed description in conjunction with the accompanying drawings, wherein like reference numerals designate like structural elements, and in which.

DETAILED DESCRIPTION

The invention includes an apparatus and method for estimating packet error rate (PER) of wireless links. The estimate uses knowledge of transmitter coding, and estimates of the noise spectrum and transmission channel response based on received data. The estimates are determined without requiring additional transmission bandwidth or overhead. PER estimates can be determined for multiple transmission data rates and multiple time-frequency codes, based on characteristics of a single transmitted data packet. The predictive estimates of PER for multiple links allows for transmission mode selection between a transmitter and a receiver based upon the estimates of PER.

Estimates of the PER can be made on multi-carrier signals (such as, orthogonal frequency division multiplexed (OFDM) signals). An exemplary embodiment includes the PER estimate being made based upon transmission channel state information (channel coefficients), coding (rate and type), noise power of the sub-carriers and the type of modulation.

Figure 2:
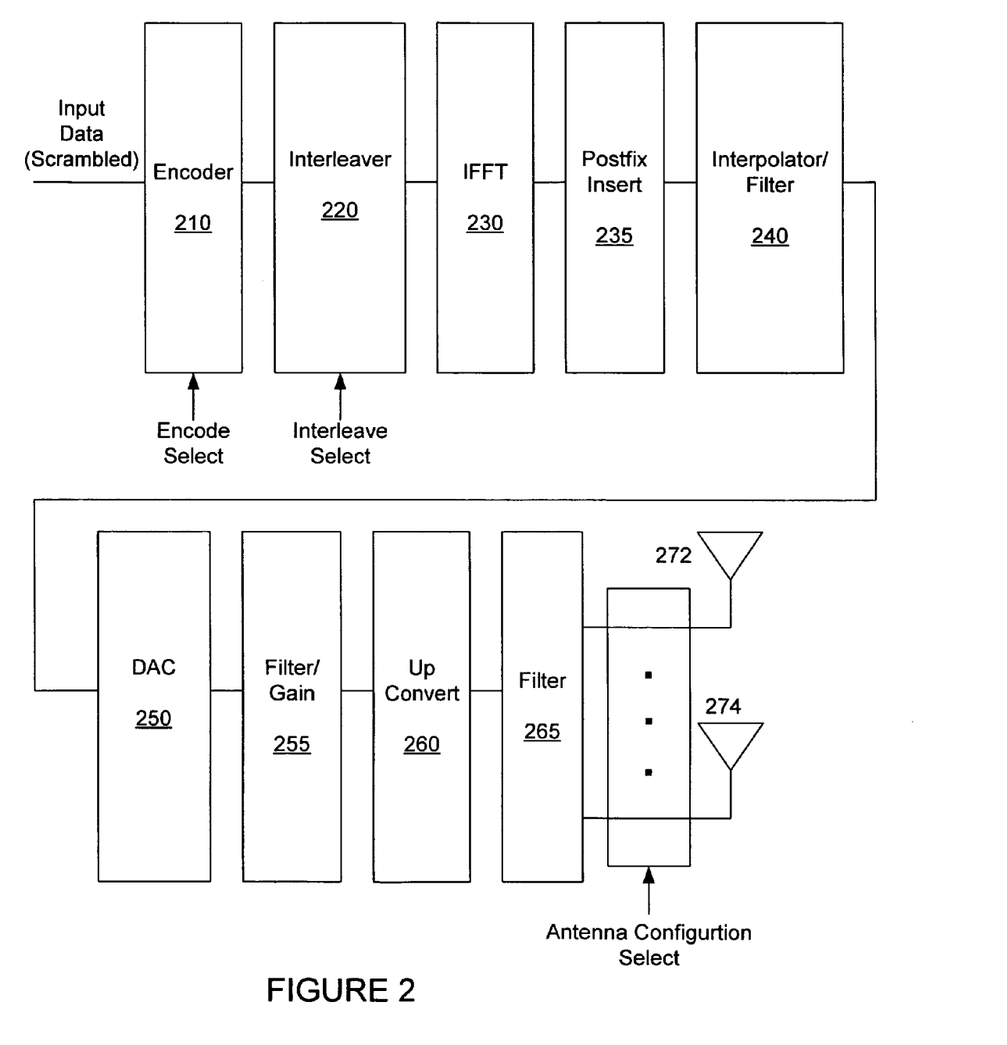
FIG. 2 shows a configuration of a multi-carrier transmitter.

FIG. 2 shows a configuration of a multi-carrier transmitter that can utilize the methods of estimating link transmission PER. The transmitter includes a data encoder 210 and an interleaver 220. After the data stream has been encoded and interleaved, it is fed into a multi-carrier modulator 230. An exemplary multi-carrier modulator 230 is an inverse-fast-fourier-transform (IFFT), which can be used for OFDM signals. More specifically, the IFFT can be an inverse discrete Fourier transform. An exemplary IFFT converts block data samples from the frequency domain to the time domain.

An embodiment of the encoder 210 includes forward error correction. The forward error correction can include at least one of convolution coding, turbo coding, LDPC coding or block coding.

The interleaver 220 is typically designed to reduce the likelihood of the transmission channel introducing a burst of errors that cannot be spread into sparse errors. Single bit errors are much easier for a decoder to correct than burst errors. For dispersive channels, as typically seen in the environments in which UWB devices operate, the likelihood of burst errors even with a well-designed interleaver, can be significant. Therefore, if the receiver possesses knowledge of the interleaver used by the transmitter, a better link PER estimate can be calculated.

Other exemplary transmitter functional blocks include a postfix inserter 235 (for some types of OFDM signals), an interpolator/filter 240, a digital to analog converter (DAC) 250, a gain/filter block 255, a frequency up-converter 260, a band-pass filter 265, and one or more antennas 270, 272. The two antennas 270, 272 are exemplary. That is, any desired number of transmit antennas can be used.

As will be described, link PER estimations can be used to predict transmission link quality for various transmission configurations. A receiver (as will be described) can determine the PER estimates, or the receiver in conjunction with the transmitter can determine the PER estimates. Based upon the PER estimates, desirable transmitter and/or receiver configurations (also referred to as modes) can be selected. The selections can be made on the encoding, the interleaving and the antenna configuration.

Figure 3:
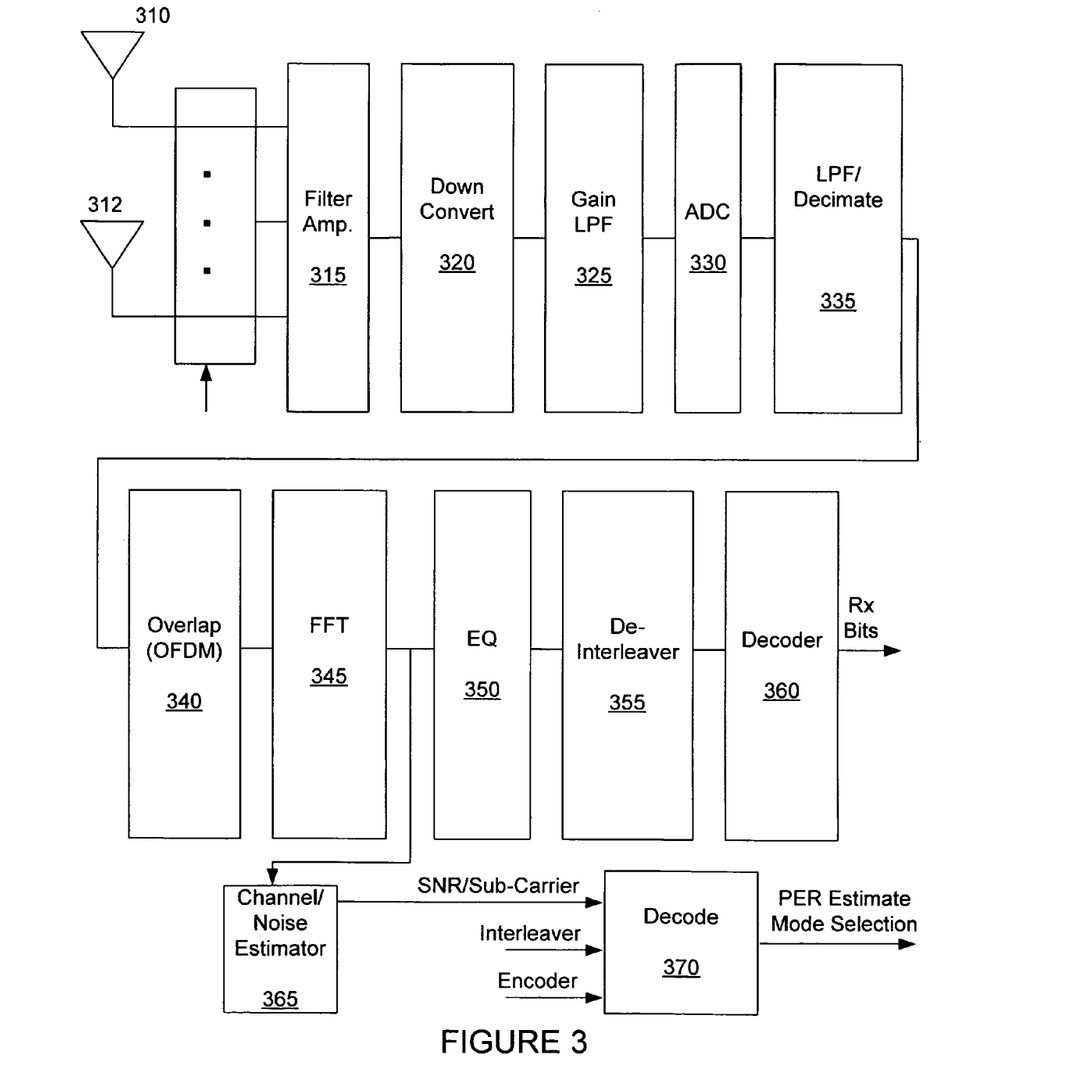
FIG. 3 shows a configuration of a multi-carrier receiver.

FIG. 3 shows a configuration of a multi-carrier receiver that can utilize the methods of estimating link transmission PER. The exemplary receiver includes receive antennas 310, 312 (a single antenna could be used, but multiple antennas can provide performance benefits). The two antennas 310, 312 are exemplary. That is, any number of desired antennas can be used. The receiver can include a filter and amplifier (LNA) 315, a frequency down-converter 320, a gain and LPF block 325, an analog to digital converter (ADC) 330, a digital filter and decimator 335, an OFDM overlap adder 340, a multi-carrier demodulator (for example, a fast fourier transform (FFT)) 345, a sub-carrier equalizer 350, a de-interleaver 355 and a decoder 360.

An exemplary controller 370 determines or calculates predicted link PER using, for example, the methods described. The controller 370 of FIG. 3 receives information regarding the interleaving (at transmitter), the coding (encoding at transmitter). The controller 370 additionally obtains estimates of the SNR of each sub-carrier (for example, during the preamble of OFDM signals) from an output of a channel and noise estimator 365. The PER estimate can be used for mode selection as well.

The channel and noise estimator 365 provides the SNR per sub-carrier estimate. The estimator 365 receives data at the output of the FFT 345 during preamble portions of the received packets. The SNR per sub-carrier estimates can be updated through the payload of the received packets, providing a more accurate estimate.

Figure 4:
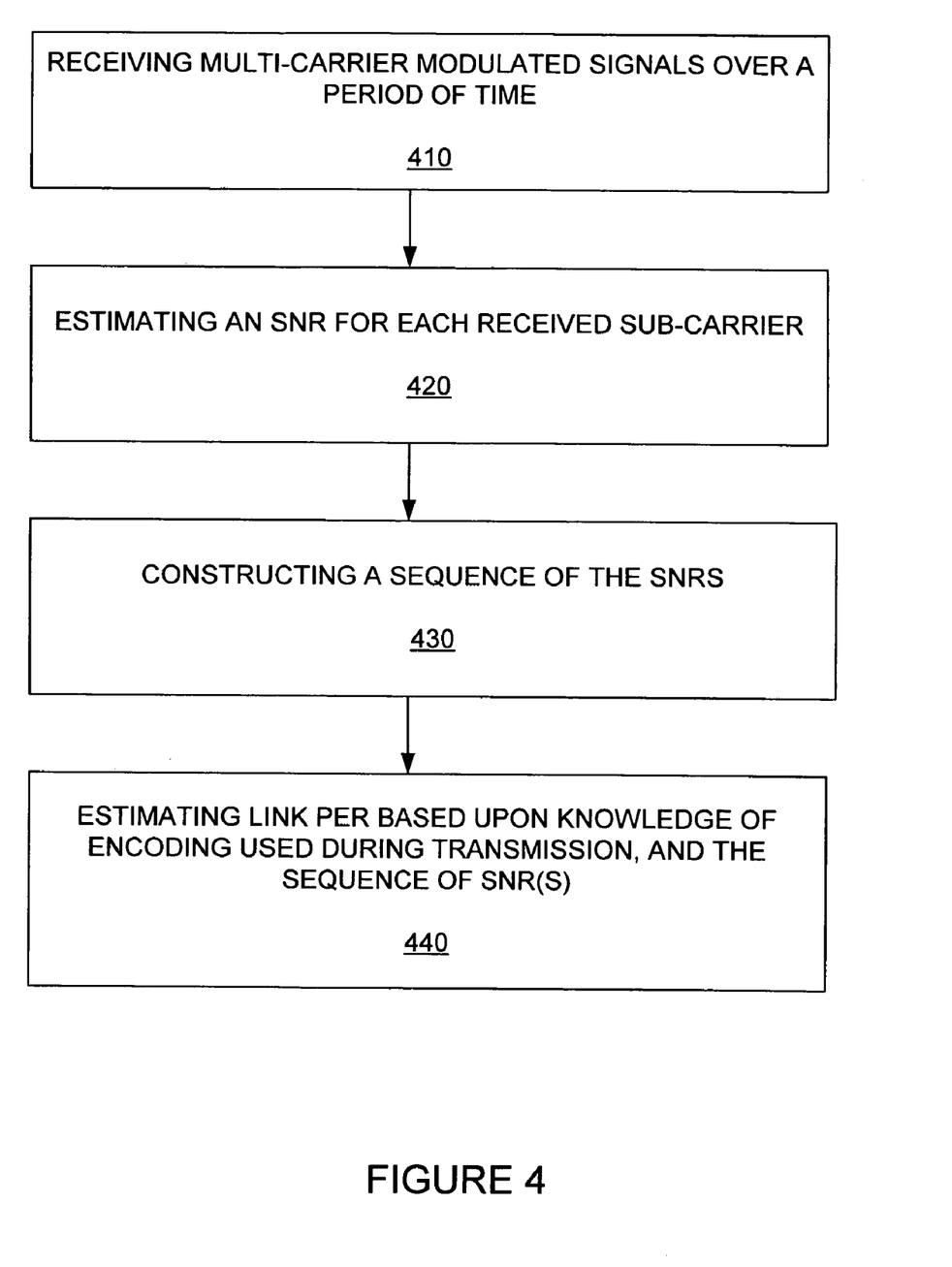
FIG. 4 is a flow chart showing an exemplary method of PER estimation of a multi-carrier transmission signal.

FIG. 4 is a flow chart of an exemplary method of estimating PER of transmission signals based upon a single data packet. A first step 410 of the method includes receiving multi-carrier modulated signals over a period of time. A second step 420 includes estimating an SNR for each received sub-carrier. A third step 430 includes constructing a sequence of the SNRs. A fourth step 440 includes estimating link PER based upon knowledge of encoding used during transmission and the sequence.

An advantage of this method is that the PER of a link can be estimated based on transmission of a single packet. By estimating the PER, and therefore, the capacity of a link using only one packet, the link throughput can be optimized more quickly and consequently reduce the latency. In addition, if the channel is being shared among multiple devices, determining the optimal throughput for each link in a timely manner ensures that each device is transmitting on the channel a smaller fraction of the time, therefore, increasing the overall throughput of the network.

The PER of packets can be estimated over time. If the link quality is changing, it can be advantageous to maintain a running average of estimated link PER. The length of the running average can be based upon an environment subjected to the transmission channels. The more noisy the environment, the longer the average can be set. For example, if the transmission is occurring in a home environment, people moving around a room in which the transmission is occurring can cause the transmission channels to change rapidly. Here, a moving average estimate of PER may be more useful. The length of the running average can be adaptive to how dynamic the channel appears to be.

Generally, the PER link estimate is made at a receiver of the multi-carrier modulated signals. That is, the link can be more easily characterized on the receiving end. The result can be fed back to the transmitter. Alternatively, the receiver can feed back measured results of the received signals, and the results can be fed back to the transmitter for characterization. The final PER estimate can be made at either the receiving device, or at the transmitting device. Clearly, if made at the transmitting device, some information regarding the received multi-carrier signals must be fed back to the transmitting device.

Receiving Multi-Carrier Modulated Signals

An exemplary embodiment of transmission signals includes multi-carrier modulated signals. To alleviate the effects of ISI, an implementation of UWB includes orthogonal frequency division multiplexing (OFDM) signal transmission. OFDM is a special form of multi-carrier modulation in which multiple user symbols are transmitted in parallel using different sub-carriers. The sub-carriers have overlapping frequency spectra, but their signal waveforms are specifically chosen to be orthogonal. OFDM systems transmit symbols that have substantially longer time durations than the length of the impulse response of the transmission channel, thereby allowing avoidance of ISI. OFDM modulation techniques are very efficient in indoor broad band wireless communication. It is to be understood that OFDM is one example of a multi-carrier transmission signal.

Estimating an SNR for Each Received sub-Carrier

An exemplary embodiment includes estimating SNR for each received carrier based upon a transmission channel, noise variance and interference. Since the SNR can vary from carrier to carrier, estimating the SNR on a carrier by carrier basis leads to the calculation of a better PER estimate. For example, for a frequency selective transmission channel, the SNR can vary greatly between over just a few carriers of a multi-carrier signal.

A transmission channel of the multi-carrier signals can be estimated based upon knowledge of training signals transmitted through the channel, and the received signals. Noise and interference of the transmission channel can be estimated based upon the estimated channel, the training signals, and the received signals. The SNR of each carrier can then be estimated.

Constructing a Sequence of the SNRs

An exemplary embodiment includes the construction of the sequence SNRs being dependent upon the interleaving of the transmitter. That is, the order of the interleaving can be used to set the order of the sequence of the SNRs. If the sequence of SNRs is constructed by the receiving device, the receiving performs the construction based on knowledge of the interleaving within the transmitting device.

Estimating Link PER

Figure 5:
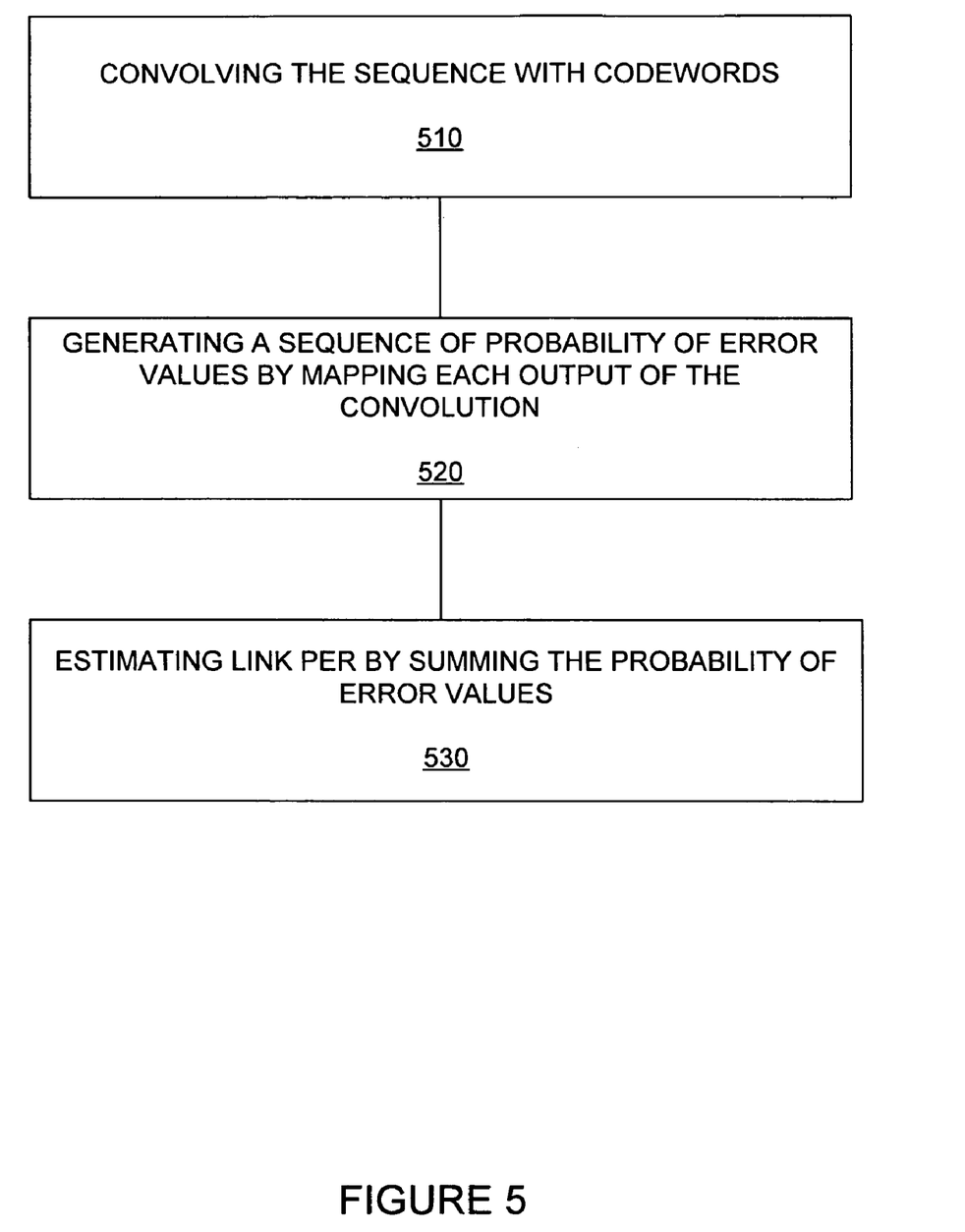
FIG. 5 is a flow chart showing an exemplary method of estimating link PER based upon knowledge of encoding used during transmission, and sequence of SNRs.

An exemplary embodiment includes estimating link PER based upon knowledge of encoding used during transmission, and the sequence of SNRs. FIG. 5 is a flow chart showing an exemplary method of estimating link PER based upon knowledge of encoding used during transmission, and sequence of SNRs. A first step 510 includes convolving the sequence with codewords. The codewords are constructed based upon knowledge of the encoding at the transmitter. A second step 520 includes generating a sequence of probability of error values by mapping each output of the convolution. A third step 530 includes estimating link PER by summing the probability of error values.

Convolving with Codewords

Generally, there are a predetermined number of codewords. A library can be used to reference the predetermined number of codewords. The total number of possible codewords for a transmission system is dependent upon the length (number of bits) of the interleaver, the length (number of bits) of the packets and the code. Generally, only a subset of the total number of codewords is actually selected for use. Generally, the set (library) of codewords that are selected are the codewords that are determined to be the most dominant contributors in determining PER estimates. The PER contributions for each codeword, can be determined by convolving the codewords with the sequence of SNRs. A subset of the codewords is typically selected to reduce complexity.

An exemplary embodiment includes the codewords having entries of 1s and 0s. Therefore, the convolution includes summing some (as determined by which entries are a 1) of the SNRs of the sequence of the SNRs. Other embodiments include codewords having values different than 1 or 0. An exemplary embodiment of convolving the sequence with codewords, includes convolving the sequence with each codeword of the library of codewords.

Generating a Sequence of Probability of Error Values

The convolution results in a sequence in which the values of the elements within the sequence are dependent upon the values of the sequence of SNRs and the values within the codewords. Each of the values of the sequence can be mapped to provide a sequence of probabilities of error. An exemplary embodiment includes the mapping being performed through the use of a look up table (LUT). That is, a probability of error is generated by the LUT for each value of the sequence. The LUT maps the value of each element of the sequence to a probability of error.

The LUT can be generated, for example, by approximating the output of a Q function for all possible LUT input values. The Q-function is well known in communication systems, and includes a finite integral of a Gaussian probability density function.

Each entry in the sequence provides an estimate of a probability of error at that point in the sequence. Packets can be defined to include M bits. The interleaver can be defined to include N bits. The number of bits within the packets can be M/N or X times the number of bits within the interleaver. Since constructing a sequence of SNRs of length N involves X repetitions of a unique sequence of SNRs of length N (assuming the SNR per sub-carrier does not change in over the duration of one packet), the convolution can be performed using only a length N SNR sequence and then multiplying the resulting probability of error by a factor of X. Generally, the convolution is circular to avoid "edge" effects.

The PER estimate can be scaled by the ratio of packet length M to interleaver length N.

Summing Probability of Error Values

The PER of the link can be estimated by summing the probability of error values of the sequence.

Mode Selection Based on Link PER Estimates

The methods of estimating link quality through PER estimates can be used for selecting transmission modes between a transmitter and a receiver. That is, generally the transmitter has several different transmission modes that include, for example, multiple transmission rates, multiple types of coding, interleaving, multiple configurations of transmitter antennas and/or multiple configurations of receiver antennas.

An embodiment of the transmission includes mode selections that include selecting a frequency hopping sequence for a multi-band transmission system. The transmission link quality can vary depending on the transmitted frequency hopping sequence due to the dependence on frequency selectivity of the transmission channel, the interleaver and the encoder. The PER estimator accurately estimates link quality for each of the possible frequency hopping sequences. Therefore, the transmitter can select the best frequency hopping sequence based on the PER estimates.

Multiple antennas can exist at both the transmitter and the receiver providing multiple input, multiple output (MIMO) communication. The communication can include diversity or spatial multiplexing.

Diversity communication can be used to minimize the effects of multipath and interference. Essentially, multiple versions of the same signal are transmitted between a transmitter and receiver. An embodiment of diversity includes receive antenna select diversity. Specifically, one of multiple receive antennas is selected for reception.

An embodiment of the receiver includes phase combining. Diversity combining is generally the preferred method of diversity reception when the received signals are correlated. If diversity combining is determined to be desirable, the optimal phase relationship between the received diversity signals must be determined. This determination can be dependent upon whether the received signals include proportionally larger noise distortion, or signal interference distortion.

Spatial multiplexing is a transmission technology that exploits multiple antennas at both transmitter and receiver to increase the bit rate in a wireless radio link with no additional power or bandwidth consumption. Under certain conditions, spatial multiplexing offers a linear increase in spectrum efficiency with the number of antennas.

An embodiment of the receiver includes Maximal Ratio Combining (MRC). Generally, MRC includes independently weighting signals received by each antenna of a multiple antenna receiver, and combining the weighted signals. Typically, the weighting is selected to maximize a signal to noise (SNR) of the combined signals. For multi-carrier signals, the weighting can be performed independently on each sub-carrier signal.

Typically, the transmission mode that is selected, is the transmission mode that provides the link have the best predicted PER.

Figure 6:
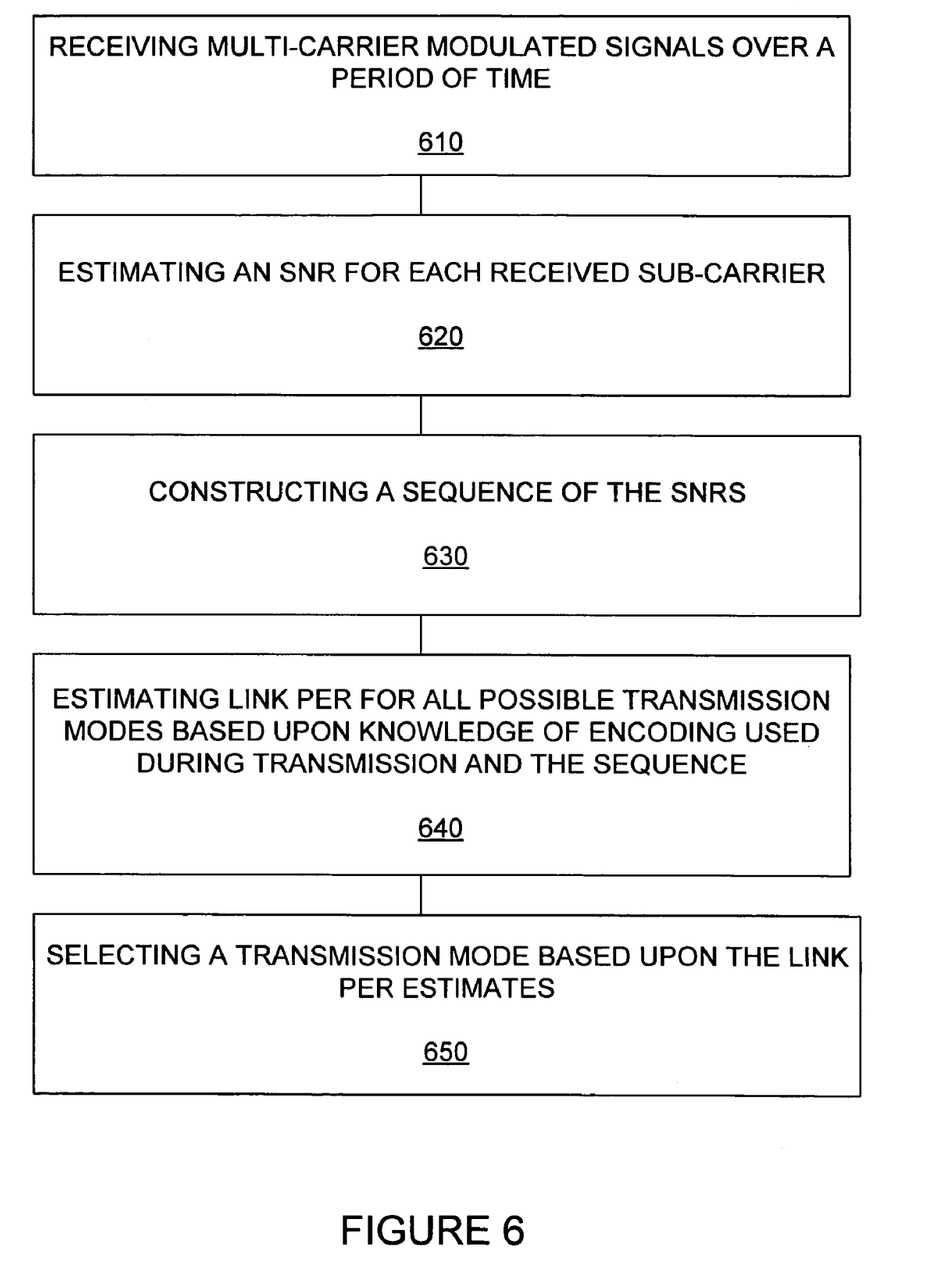
FIG. 6 is a flow chart showing an exemplary method of selecting a transmission mode of a transmission link based on a predicted link quality of the link.

FIG. 6 is a flow chart that shows an exemplary method of selecting a transmission mode of a transmission link based on a predicted link quality of the link. A first step 610 of the method includes receiving multi-carrier modulated signals over a period of time. A second step 620 includes estimating an SNR for each received sub-carrier. A third step 630 includes constructing a sequence of the SNRs. A fourth step 640 includes estimating link PER for all possible transmission modes based upon knowledge of encoding used during transmission and the sequence. A fifth step 650 includes selecting a transmission mode based upon the link PER estimates.

One embodiment can include the receiver selecting the mode, and feeding the mode selection back to the transmitter. Another embodiment includes the receiver receiving the multi-carrier modulated signals, and performing only a subset of the processing. The semi-processed signals are fed back to the transmitter, and the transmitter makes the final transmission mode selection.

If the transmission channel between transmitter and the receiver are approximated to be the same in both transmission directions, then the transmitter can receive signals from the receiver and make the mode selection. That is, reciprocity of the transmission channel between the transmitter and the receiver is assumed. The transmitter then makes a mode selection based on one packet received from the receiving (transceiver) device. Situations can occur which do not allow reciprocity to be assume. For example, reciprocity can not be assumed if, for example, an interferer is located proximate to the receiver. In this situation, the transmitter can not properly estimate the SNRs per sub-carrier as received at the receiver. In this situation, the receiver should either estimate the PER and feed it back to the transmitter, or at least feed back the SNRs per sub-carrier.

Figure 7:
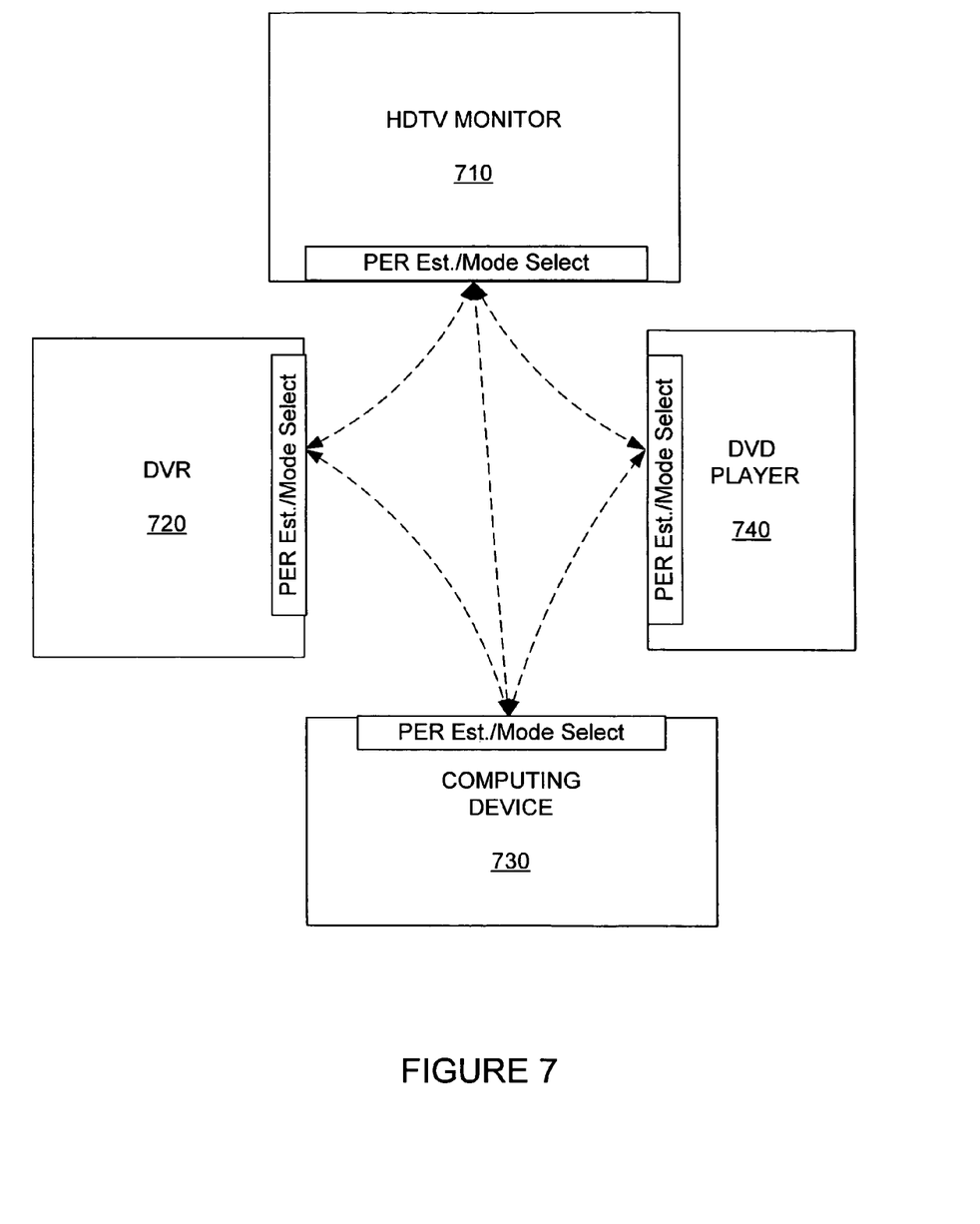
FIG. 7 shows a UWB mesh network that includes devices that include PER estimation or mode selection based on PER estimation.

FIG. 7 shows networked components that can benefit from the use of transmission pre-processing that include multi-carrier time spreading. The network can include, for example, a high definition television (HDTV) monitor 710 networked with other devices, such as, a digital video recorder (DVR) 720, a digital video disk (DVD) player 740 and a computing device 730. Each of the components 710, 720, 730, 740 includes PER estimations and/or mode selection based upon PER estimations as have been described.

Although specific embodiments of the invention have been described and illustrated, the invention is not to be limited to the specific forms or arrangements of parts so described and illustrated. The invention is limited only by the appended claims.

What is claimed:

1. A method of predicting link quality of a link, comprising:
   receiving multi-carrier modulated signals over a period of time;
   estimating an signal to noise ratio (SNR) for each received sub-carrier;
   constructing a sequence of the SNRs;
   estimating link packet error rate (PER) based upon knowledge of encoding used during transmission and the sequence;
   wherein estimating link PER based upon knowledge of encoding used during transmission, and the sequence comprises:
   convolving the sequence with codewords, wherein the codewords are constructed based upon knowledge of the encoding at a transmitter;
   generating a sequence of probability of error values by mapping each output of the convolution;
   estimating link PER by summing the probability of error values.

2. The method of claim 1, further comprising de-interleaving the sequence of SNRs based upon knowledge of transmission interleaving.

3. The method of claim 1, wherein estimating SNR for each received sub-carrier is based upon a transmission channel, noise variance and interference.

4. The method of claim 1, wherein the multi-carrier modulated signals are OFDM signals.

5. The method of claim 1, wherein estimating link PER is performed per packet.

6. The method of claim 5, further comprising:
   estimating link PER of packets over time, and maintaining a running average of the estimated link PER.

7. The method of claim 6, wherein length of the running average is based upon how rapidly transmission channels are varying.

8. The method of claim 1, wherein the PER link estimate is made at a receiver of the multi-carrier modulated signals.

9. The method of claim 1, wherein the PER link estimate is made at the transmitter of the multi-carrier modulated signals based on feedback from a receiver of the multi-carrier modulated signals.

10. The method of claim 8, wherein at least one of the receiver and a transmitter comprises multiple receive antennas.

11. The method of claim 10, wherein the receiver comprises maximal ratio combining.

12. The method of claim 10, wherein the receiver comprises phase combining.

13. The method of claim 10, wherein the receiver comprises receive antenna select diversity.

14. The method of claim 1, wherein the encoding comprises forward error correction (FEC) coding comprising at least one of convolutional, turbo and LDPC coding.

15. The method of claim 1 wherein convolving the sequence with codewords comprises convolving the sequence with each codeword of a library of codewords.

16. The method of claim 1 wherein estimating PER further comprises scaling the estimate by a ratio of packet length to interleaver length.

17. A method of predicting link quality of a link, comprising:
   receiving multi-carrier modulated signals over a period of time;
   estimating an signal to noise ratio (SNR) for each received sub-carrier;
   constructing a sequence of the SNRs;
   estimating link packet error rate (PER) based upon knowledge of encoding used during transmission and the sequence;
   wherein estimating link PER based upon knowledge of encoding used during transmission and the sequence comprises;
   convolving the sequence with each codeword of a library of codewords, wherein the codewords are constructed based upon knowledge of the encoding at a transmitter;
   generating a sequence of probability of error values by mapping each output of the convolution;
   estimating link PER by summing the probability of error values.

18. A method of selecting a transmission mode of a transmission link based on a predicted link quality of the link, comprising:
   receiving multi-carrier modulated signals over a period of time;
   estimating an signal to noise ratio (SNR) for each received sub-carrier;
   constructing sequence of the SNRs;
   estimating link packet error rate (PER) for all possible transmission modes based upon knowledge of encoding used during transmission and the sequence;
   selecting a transmission mode based upon the link PER estimates;

wherein estimating link PER based upon knowledge of encoding used during transmission, and the sequence comprises;

convolving the sequence with codewords, wherein the codewords are constructed based upon knowledge of the encoding at a transmitter;

generating a sequence of probability of error values by mapping each output of the convolution;

estimating link PER by summing the probability of error values.

19. The method of claim 18, wherein the mode that is selected is the mode that corresponds with the best PER estimate.

20. The method of claim 18, wherein the modes comprise at least one of multiple data transmission rates, multiple codes, multiple transmit antennas and multiple receive antennas.

* * * * *